United States Patent
Schulze et al.

(10) Patent No.: US 9,709,977 B2
(45) Date of Patent: Jul. 18, 2017

(54) CONVEYOR SYSTEM FOR CONVEYING OBJECTS AND CONTROL PROCESS FOR SUCH A SYSTEM

(71) Applicant: Eisenmann SE, Boeblingen (DE)

(72) Inventors: Herbert Schulze, Aidlingen (DE); Svenja Vetter, Neustetten (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/943,156

(22) Filed: Nov. 17, 2015

(65) Prior Publication Data
US 2016/0139591 A1  May 19, 2016

(30) Foreign Application Priority Data
Nov. 17, 2014 (DE) .......................... 10 2014 016 900

(51) Int. Cl.
*G06F 7/00* (2006.01)
*G05B 19/418* (2006.01)
*B62B 5/00* (2006.01)
*B62B 3/06* (2006.01)

(52) U.S. Cl.
CPC ...... *G05B 19/41835* (2013.01); *B62B 5/0093* (2013.01); *B62B 3/0612* (2013.01); *B62B 5/0033* (2013.01); *B62B 5/0083* (2013.01); *G05B 2219/25385* (2013.01)

(58) Field of Classification Search
USPC ........................................................ 700/214
See application file for complete search history.

(56) References Cited

U.S. PATENT DOCUMENTS

| 8,275,480 B2 * | 9/2012 | Smith | G05D 1/0219 |
| | | | 414/788.7 |
| 2015/0170429 A1 * | 6/2015 | Denny | B60W 30/09 |
| | | | 701/36 |

FOREIGN PATENT DOCUMENTS

| DE | 10 2008 014 877 A1 | 11/2009 |
| DE | 10 2011 121 414 A1 | 6/2013 |
| DE | 20 2014 006 562 U1 | 10/2014 |
| DE | 10 2013 018 820 A1 | 5/2015 |
| EP | 2 100 831 A1 | 9/2009 |
| WO | 2009-043474 A2 | 4/2009 |
| WO | 2013087275 A1 | 6/2013 |

* cited by examiner

*Primary Examiner* — Kyle Logan
(74) *Attorney, Agent, or Firm* — Factor Intellectual Property Law Group, Ltd.

(57) ABSTRACT

A control process for a conveyor system for conveying pallets or other objects comprises at least two mutually separate free-moving, i.e. not rail-mounted, conveyor units. Of the at least two conveyor units, a first conveyor unit is assigned a superordinate status and a second conveyor unit is assigned a subordinate status. The second conveyor unit therefore follows the first conveyor unit. To this end, the second conveyor unit detects a shift in the mutual relative position of the two conveyor units with the aid of a sensor and modifies its driving parameters depending on the shift in position detected by the sensor.

7 Claims, 8 Drawing Sheets

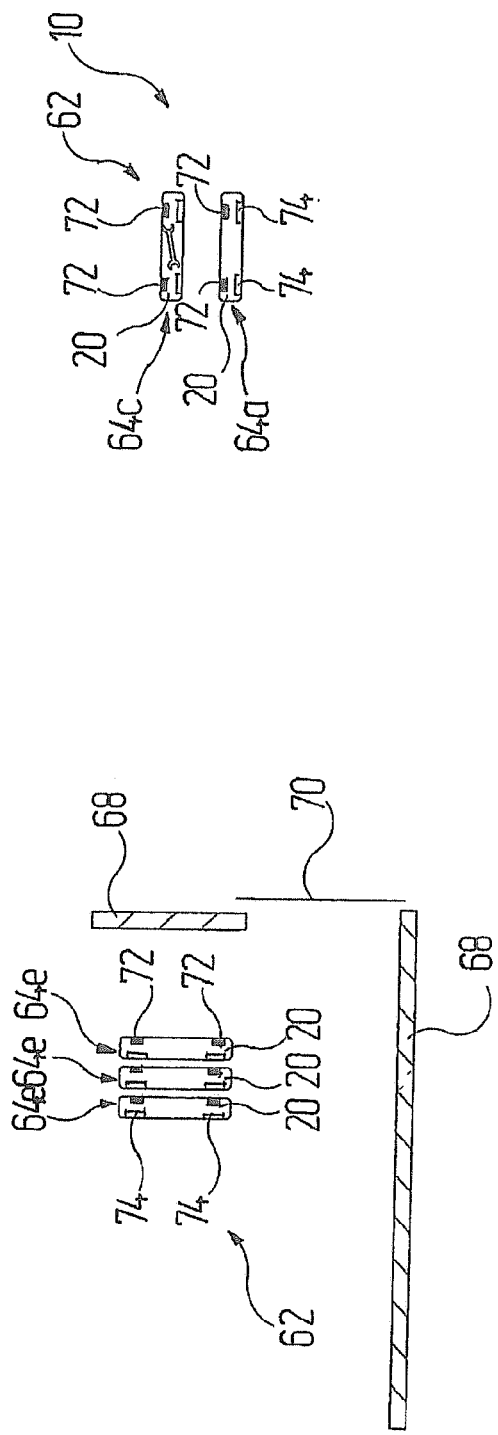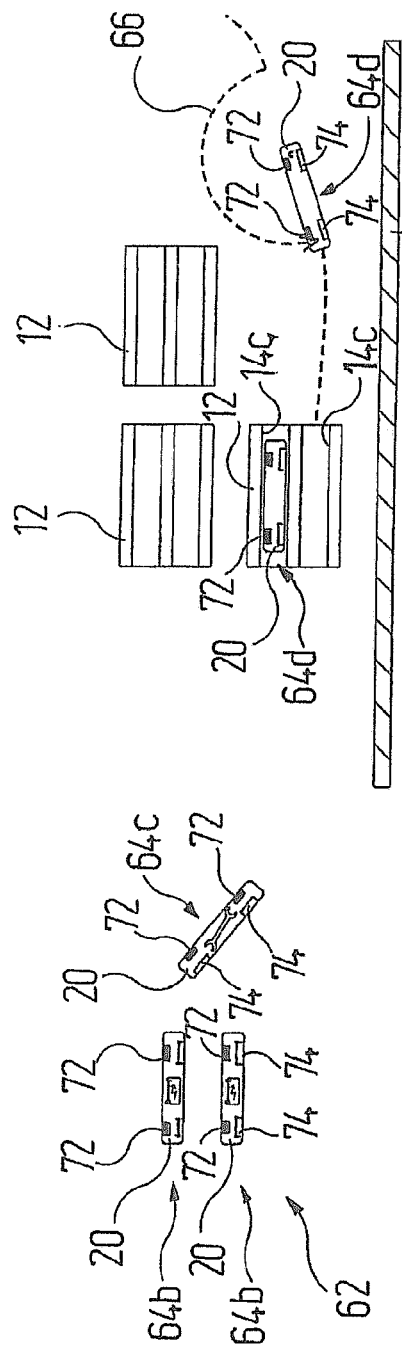
Fig. 8

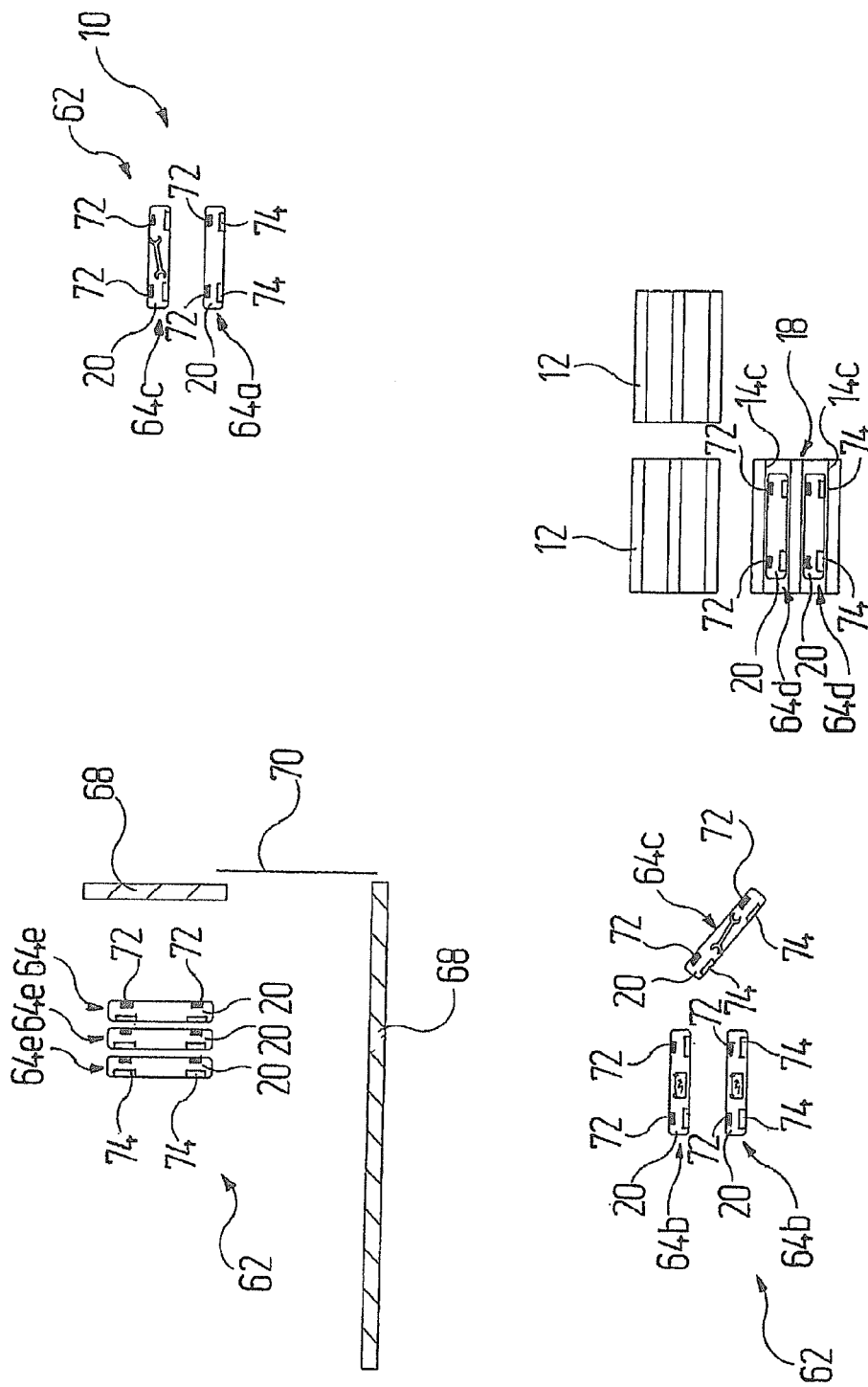

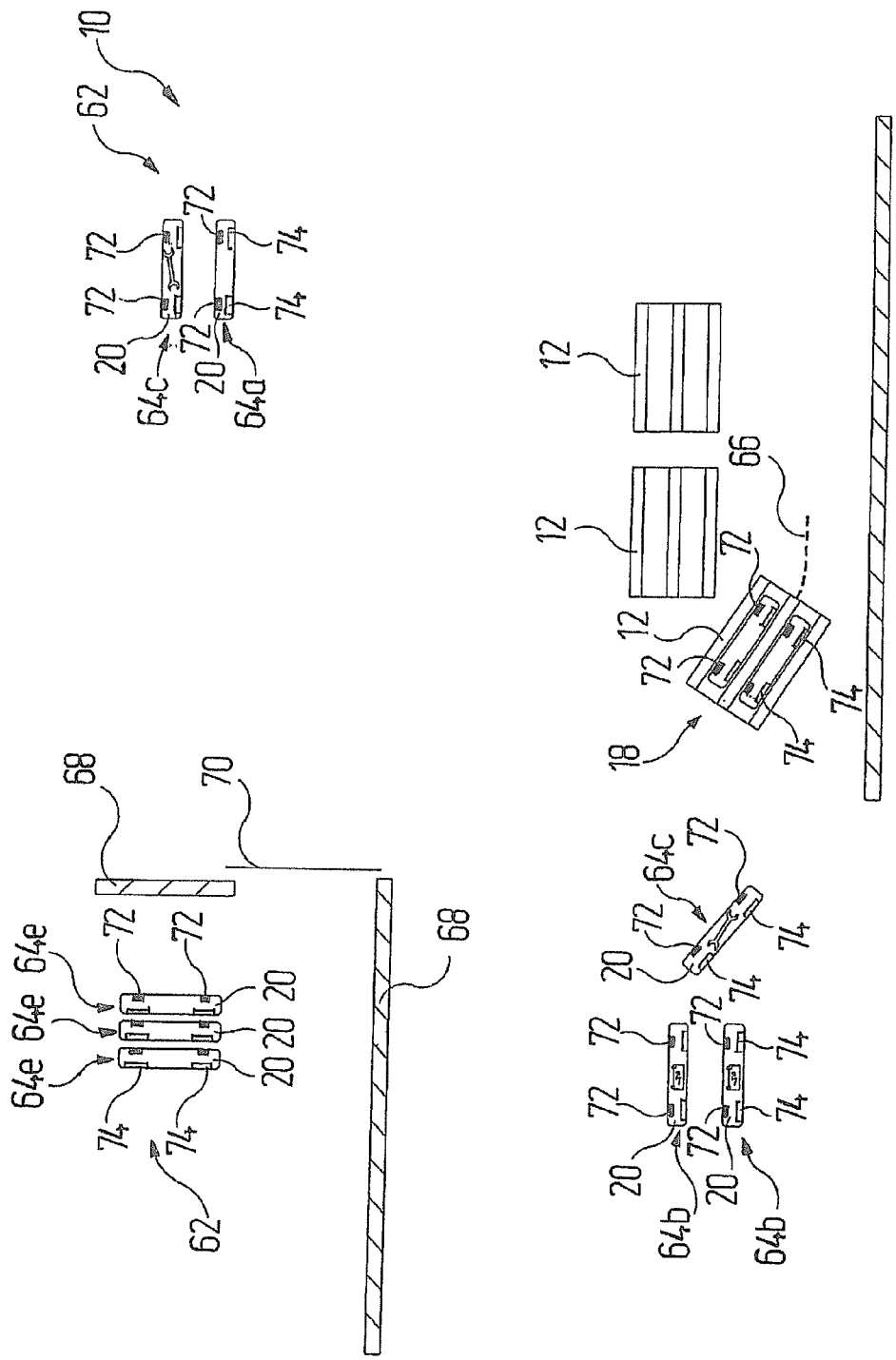

CONVEYOR SYSTEM FOR CONVEYING OBJECTS AND CONTROL PROCESS FOR SUCH A SYSTEM

CROSS-REFERENCE TO RELATED APPLICATIONS

The present application claims benefit of German patent application no. 10 2014 016 900.6 filed Nov. 17, 2014—the full disclosure of this application is incorporated herein by reference.

BACKGROUND OF THE INVENTION

Field of the Invention

The invention relates to a conveyor system for conveying objects such as pallets or other load carriers, which comprises at least two mutually separate conveyor units, and a control process for such a conveyor system.

Description of the Prior Art

DE 10 2008 014 877 A1 discloses a conveyor system in which in each case two conveyor units in the style of a transport trolley form a conveyor device, with two transport trolleys being designed to convey load carriers in the form of pallets. To this end, the two transport trolleys can move under a pallet as a transport-trolley pair, then lift it and convey it to another location. In particular, the conveyor system enables automatic loading of pallets into lorries. To this end, each transport trolley is provided with an electrical supply cable fastened to it, which supplies and controls the drives of the transport trolley, transmits sensor signals and can furthermore be used as a pull cable to correct the transport trolleys in terms of their movement direction. The supply cables are moreover used as pull cables to implement amendments to the route. A conveyor system of this type is, however, very limited in terms of its flexibility.

DE 20 2014 006 562 U1 discloses a conveyor system which comprises conveyor units which are mutually separate and can be moved independently of one another.

SUMMARY OF THE INVENTION

It is an object of the invention to provide a control process for a flexible conveyor system which comprises free-moving mutually separate conveyor units, which control process coordinates and synchronises the movements of said conveyor units so that they can jointly transport objects and in particular a load carrier. A further object of the invention is to provide a conveyor system which is suitable for carrying out the process.

In an embodiment, this object may be achieved by a control process for a conveyor system for conveying objects, which comprises at least two mutually separate, free-moving (i.e. not rail-mounted) conveyor units. According to the invention, provision is made for a first conveyor unit to be assigned a superordinate status and a second conveyor unit to be assigned a subordinate status in such a way that the second conveyor unit follows the first conveyor unit in that the second conveyor unit detects a shift in the mutual relative position of the first and the second conveyor unit with the aid of a sensor and modifies driving parameters, which are used to control it, depending on the sensor-detected shift in the relative position.

The invention is based on the conception that, if two or more conveyor units are to move towards a destination as a group, the conventional individual control of the conveyor units can lead to difficulties. If the spacing between the conveyor units of a group is too small, there is for example the risk of conveyor units colliding in the event of the conveyor units deviating slightly from their intended route. Difficulties also arise when an object is to be conveyed jointly by two mechanically separate conveyor units. In this case, it is frequently necessary for the movements of the conveyor units to be matched very precisely to one another, for example to prevent the object from slipping. In such cases, the conventional individual control is rapidly limited because the deviations from the intended routes are often too great.

The assignment of a superordinate status to a first conveyor unit and a subordinate status to one (or more) second conveyor unit(s) enables the routes of the conveyor units to be matched very precisely to one another because the second conveyor unit with the subordinate status is orientated directly on the route of the conveyor unit with the superordinate status. With this, the second conveyor unit determines a shift in the mutual relative position of the first and the second conveyor unit with the aid of a sensor and matches their driving parameters, such as velocity and steering angle, accordingly. Undesired deviations between the routes can therefore be considerably reduced. It is thus possible to prevent conveyor units which are driven in groups from colliding and to prevent objects which are conveyed together from slipping.

In some instances, it is also possible to reduce the complexity involved in controlling the conveyor units because only the first conveyor unit with the superordinate status has to find its way. On the other hand, it is possible to dispense with separate localisation and navigation for the second conveyor unit with the subordinate status.

In an embodiment the objects are laden or unladen load carriers, which can be constructed for example as pallets. Each conveyor unit moreover comprises a chassis which can move on floor rollers, as well as a supporting element which is carried along by the chassis and can be lifted or lowered in relation to the chassis in such a way that, in an empty configuration, the conveyor unit can move under a load carrier and, in a conveying configuration, can receive a load carrier by means of the supporting element. Each conveyor unit further comprises a drive system, by means of which at least one of the floor rollers and the supporting element can be driven, and a control device to which a central control assigns a route and, from this, determines driving parameters which are used to control the drive system.

When they are located in their conveying configuration and have received a load carrier together, the first conveyor unit and the second conveyor unit may form a conveyor device which is designed to convey the load carrier. In this case, at least when the load carrier is unladen, the first conveyor unit can be assigned the superordinate status and the second conveyor unit can be assigned the subordinate status.

The central control of the conveyor system may combine conveyor units to form conveyor devices according to requirements, with it being possible to source the necessary conveyor units from conveniently situated stocks of the conveyor system. A failure of a conveyor unit therefore involves a relatively short down time of the conveyor system, which increases the availability of the conveyor system.

To drive the two separate conveyor units together, the central control may specify a respective route for both conveyor units.

When transporting unladen, or only lightly laden, load carriers, too little traction may cause one or more of the floor rollers of a conveyor unit to slip, resulting in a relative movement between the conveyor units. Owing to the low adhesion between conveyor units and load carrier in this case, a relative movement also occurs between the conveyor units and the load carrier. Furthermore, different degrees of wear on the floor rollers can result in a conveyor unit having an actual velocity which differs from the velocity derived from the calculation based on a set rotational speed and a standard floor-roller diameter. This would intrinsically result in two different velocity vectors in one conveyor device, in which case both the value and the direction can deviate from one another.

In the case of heavily laden load carriers, this problem does not generally arise because the load carrier, owing to its weight, couples the two conveyor units rigidly to one another and it is therefore not possible for different velocity vectors to occur. Wear or relatively large tolerances may then be perceived through different power consumptions of the drives and can be compensated, where necessary, by way of the control device. Nevertheless, the assignment of a superordinate and a subordinate status in the conveyor device is also possible here.

Provision can be made for the conveyor units to move towards a load carrier to be transported individually and independently of one another so long as they have not formed a conveyor device. This enables each conveyor unit to move along the optimum path for it time-wise until it reaches the load carrier. However, the assignment of a superordinate and a subordinate status can already take place at this point.

In an embodiment, the sensor is arranged along a longitudinal side and for the second conveyor unit to be aligned in such a way that the sensor of the second conveyor unit faces in the direction of the first conveyor unit. The sensor then detects the relative position of the first conveyor unit from the side. This is also possible when the conveyor units convey a pallet or other load carrier together, because these often have an opening extending in the transverse direction through which the sensor can detect the first conveyor unit. The sensor can be constructed in particular as an optical sensor which detects light signals generated by a (laser) light source arranged on the same conveyor unit or on the opposing conveyor unit. The sensor can be constructed in particular as a laser optical triangulation sensor, such as that provided for example by the company Micro-Epsilon. In these sensors, a laser light source and a position-sensitive measuring element, e.g. a CCD cell, are integrated in one module.

Provision can furthermore be made so that, when driving in a diagonal direction with respect to the longitudinal axis of the conveyor device, the floor rollers of each conveyor unit of the conveyor device are in each case parallel to one another. To this end, all floor rollers are driven synchronously and identically.

It is particularly advantageous if, when driving in a direction which is perpendicular to the longitudinal axis of the conveyor device, axes of all floor rollers of the first conveyor unit are coaxial, and axes of all floor rollers of the second conveyor unit are coaxial. The fact that the load carrier is used as a connecting element enables a particularly flexible driving mode of the conveyor device which cannot be executed by the individual components. It is thereby possible to realise a change in direction of the conveyor device through 90° without cornering. In particular, by means of this driving mode, it is rapidly possible to achieve precise positioning of the conveyor unit within a relatively small space, for example when loading a lorry.

Furthermore, when driving straight ahead, the floor rollers in each chassis end region of the first conveyor unit of the conveyor device may be substantially coaxial to the floor rollers in the corresponding chassis end region of the second conveyor unit of the conveyor device. Alternatively, the axes of the floor rollers of two conveyor units can each be offset in pairs in the direction of travel. However, this must be taken into account mathematically when cornering.

In the event of a failure of a conveyor unit, the conveyor device can be dismantled and re-formed using a newly added conveyor unit. The newly added conveyor unit here can be assigned the superordinate or the subordinate status of the faulty conveyor unit.

In an embodiment, provision is made to enable the subordinate and the superordinate status of the conveyor units to be switched at any time. For example, if the sensor of the conveyor unit with the subordinate status fails, with the result that a shift in the mutual relative position of the first and the second conveyor unit cannot be detected any more, this conveyor unit can continue its journey in the superordinate position. To this end, if the sensor is only arranged on one longitudinal side, the conveyor units are re-orientated so that the required orientation is re-established. It is alternatively possible to use conveyor units which do not have any asymmetry in terms of their structural design. The flexibility of the conveyor system is thereby increased considerably.

Provision can furthermore be made to enable the conveyor units to find their route by means of cameras or other sensors. To prevent damage to objects or people, each conveyor unit can comprise safety devices which detect items or persons located on the route and communicate this to the central control or the control device of the conveyor unit so as to implement a change in the driving parameters. The sensors here can be arranged on one or both end faces of the conveyor unit.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Embodiments of the invention are explained in more detail below with reference to the drawings, which show:

FIG. 8 a view from above, corresponding to FIG. 7, of the loading area, wherein the second conveyor unit has executed a turn;

FIG. 9 a view from above, corresponding to FIG. 8, of the loading area, wherein the two conveyor units form the conveyor device;

FIG. 10 a view from above, corresponding to FIG. 9, of the loading area, wherein the conveyor device transports the load carrier.

DESCRIPTION OF PREFERRED EMBODIMENTS

Figure 1:
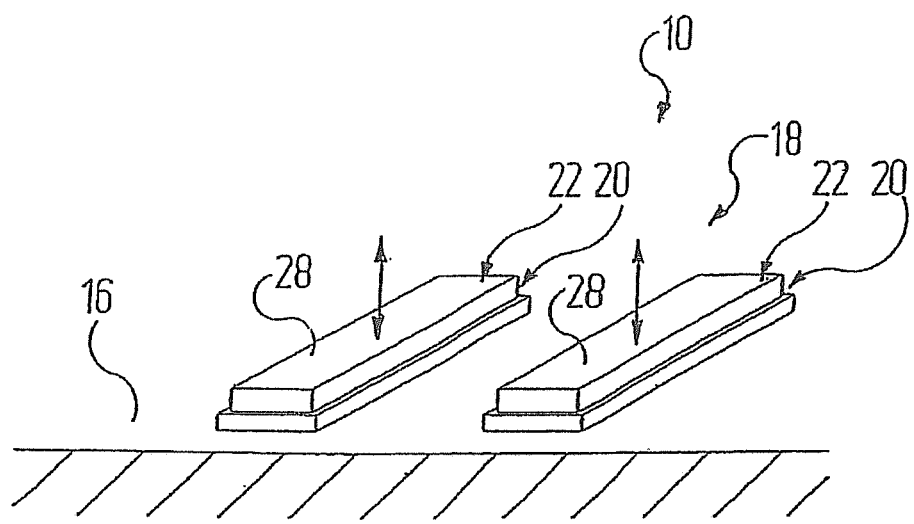
FIG. 1 a perspective view of a conveyor system for conveying load carriers, in which two fork-type conveyor units, which can move independently of one another, form a conveyor device.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Basic Construction of the Conveyor System

Figure 2:
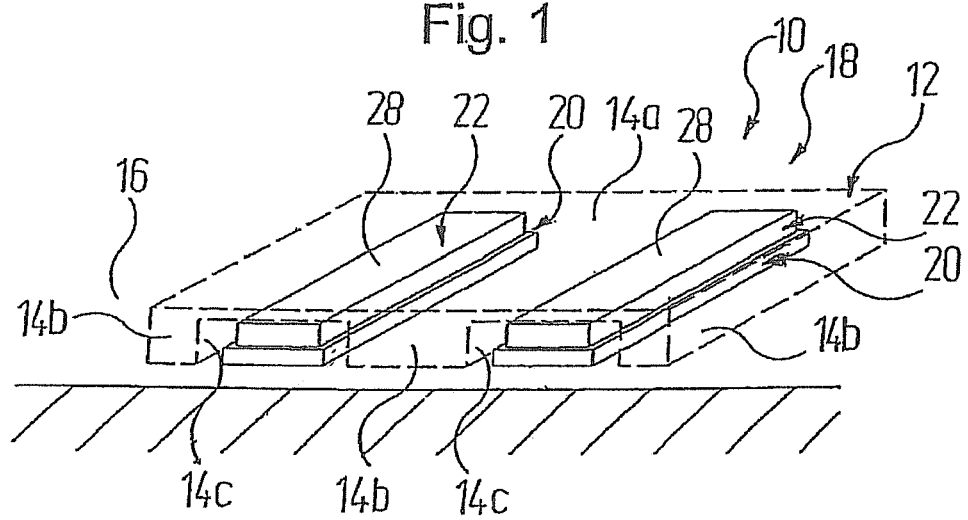
FIG. 2 a perspective view of the conveyor system according to FIG. 1, wherein a load carrier is moreover shown in the form of a pallet.

In the Figures, 10 denotes a conveyor system as a whole, by means of which objects—laden or unladen load carriers 12 in this case—can be conveyed. FIG. 2 shows a pallet, such as is known per se, as an example of a load carrier 12.

A load carrier 12 has a supporting surface 14a on which material to be conveyed (not shown specifically) can be deposited and fastened. The supporting surface 14a rests on a floor 16 by way of bearing elements 14b. A respective opening 14c remains between two adjacent bearing elements 14b and is open downwards towards the floor 16 and at both end faces. In particular, a load carrier 12 of this type can be constructed as a so-called Euro pallet.

The conveyor system 10 comprises a plurality of conveyor devices 18 which can be moved on the floor 16. A conveyor device 18 is in turn formed by two conveyor units 20. In the present embodiment, the conveyor units 20 have an outer contour which corresponds approximately to that of a fork of a forklift.

These conveyor units 20 communicate in a manner known per se with one another or with a central control (not shown specifically) which coordinates the conveying process.

Figure 3:
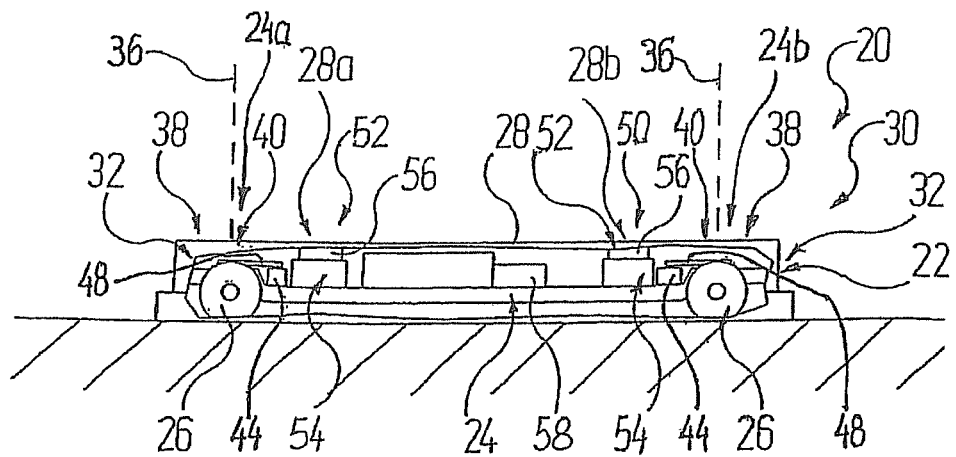
FIG. 3 a side view of a conveyor unit in an empty configuration in partial phantom view, so that a chassis, a drive system and a lifting/lowering device for a supporting element can be seen.
Figure 4:
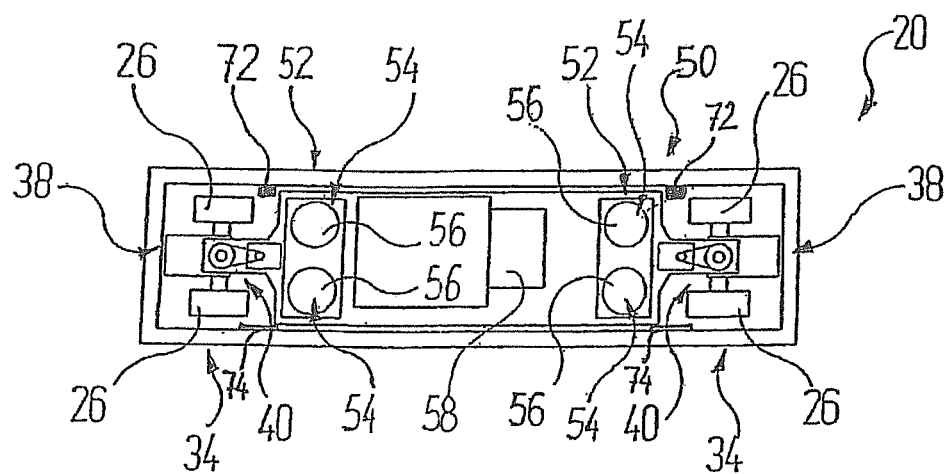
FIG. 4 a view from above in a partial phantom view of the conveyor device.

In FIGS. 3 and 4, one of the conveyor units 20 of the conveyor device 18 is shown separately. The conveyor unit 20 comprises a chassis 24 which can be moved on floor rollers 26 and defines two end regions 24a, 24b.

The chassis 24 moreover carries along a supporting element 28, which can be lifted or lowered in relation to the chassis 24; this is merely represented in FIG. 1 by double-headed arrows. If the supporting element 28 assumes a lowered position, the conveyor unit 20 is in an empty configuration in which it can move under the load carrier 12. In this empty configuration, the conveyor unit 20 can also move through the opening 14c of the load carrier 12, i.e. the conveyor unit 20 can move under the load carrier 12 on one side, pass through underneath this and re-emerge from the load carrier 12 on the other side. To this end, the conveyor unit 20 is matched to load carriers 12 to be conveyed in terms of its outer contour. In the case of a pallet, this means that, in its empty configuration, the dimensions of the conveyor unit 20 are such that it can move into one of the openings 14c thereof so that the conveyor unit 20 is located in this opening 14c under the supporting surface 14a of the pallet.

Conversely, the load carrier 12 also has to be adapted to the conveyor units 20 and at least provide space for two conveyor units 20, for example in the form of two such openings 14c.

The supporting element 28 of a conveyor unit 20 is then lifted in relation to the chassis 24. If the supporting element 28 assumes a lifted position, the conveyor unit 20 is located in a conveying configuration in which it can receive a load carrier 12 by means of its supporting element 28 and convey it together with a further conveyor unit 20.

As shown in FIGS. 3 and 4, each conveyor unit 20 comprises a drive system 30 by means of which the floor rollers 26 and the supporting element 28 can be driven.\

For the chassis 24, the drive system 30 comprises a traction drive 32 which drives the floor rollers 26. the floor rollers 26 are mounted in each case as a roller pair 34 such that they can rotate about a steering axis of rotation 36. The steering axes of rotation 36 are only shown in FIG. 3 and extend vertically when the conveyor unit 20 rests with the floor rollers 26 on a horizontally level floor 16.

The traction drive 32 comprises drive units 38 and steering units 40 on the opposing end regions 24a, 24b of the chassis 24. The drive units 38 comprise electric drive motors 42 which drive the floor rollers 26 without interconnected transmission means.

The steering units 40 each comprise an electric steering motor 44 which can adjust the position of the floor rollers 26 in relation to their steering axis of rotation 36 by way of transmission means 46; a belt pull 48 is shown by way of example in FIGS. 3 and 4.

The conveyor units 20 are now driven in that the electric drive motors 42 and the electric steering motors 44 are supplied with current in mutually synchronised manner.

If all four floor rollers 26 of a conveyor unit 20 are aligned perpendicularly to the longitudinal direction of the conveyor unit 20 and all electric drive motors 42 are controlled identically, the conveyor unit 20 assumes a linear-movement configuration for driving straight ahead; this is illustrated by way of example by the conveyor unit 20 shown in FIG. 4.

For cornering, the alignment of the axes of the floor rollers 26 has to be altered in relation to the longitudinal direction of the conveyor units 20. To this end, the floor rollers 26 can be rotated about the axis of rotation 36, in each case as a roller pair, by means of the electric steering motors 44.

The conveyor unit 20 can therefore assume a cornering configuration and drive through a curve if the roller pairs 34 are aligned so that the axes of the floor rollers 26 are perpendicular to the curve to be followed. In the case of a conveyor device 18 with two conveyor units 20, a pallet 14 can then also be rotated on the spot, for example, if all four roller pairs 34 of the two conveyor units 20 are aligned in this way on one and the same circle.

When cornering, the control can also take into account the different paths of the radially outer floor rollers 26 (relative to the curve) with respect to the radially inner floor rollers 26. The different paths can also be compensated by transmission means of the drive units 38.

For lifting and lowering the supporting element 28, the drive system 20 comprises a lifting/lowering device 50. This lifting/lowering device 50 operates independently of the traction drive 32.

The drive system 20 is therefore designed in such a way that the supporting element can execute a movement which can be described as a superimposition of a horizontal movement component of the chassis 24 and a vertical movement component of the supporting element 28. This means that the conveyor device 18 can lift or lower the load carrier 12 with or without a load whilst moving. The conveyor units 20 of the conveyor device 18 do not have to be stationary for this, but can be if required.

The lifting/lowering device 50 comprises two lifting/lowering units 52 of which, in the present embodiment, one is arranged on each of the two end regions 24a, 24b of the chassis 24. The two lifting/lowering units 52 are each coupled to different regions 28a, 28b of the supporting element 28. The lifting/lowering units 52 can each effect a lifting or lowering of the supporting element 28 at the coupling points.

FIGS. 3 and 4 show an embodiment in which each lifting/lowering unit 52 comprises at least one respective operating cylinder 54, which acts on the sides of the supporting element 28 which face the chassis 24 by means of a movable cylinder element 56.

As shown in FIG. 4, a lifting/lowering unit 52 can also comprise two operating cylinders 54 in each case, which are mounted next to one another on the chassis 24, transversely to the longitudinal direction of the conveyor unit 20.

In this case, the two lifting/lowering units 52 of a drive unit 20 can be operated independently of one another. In FIG. 3, the conveyor unit 20 is shown in its empty configuration.

On the one hand, in comparison with the empty configuration, the supporting elements 28 can be lifted evenly with respect to the chassis 24 and assume a corresponding conveying configuration.

On the other hand, however, the supporting element 28 can also be brought into a longitudinally inclined conveying configuration in the longitudinal direction of the conveyor unit 20, with the supporting element 28 at one end region 24a of the chassis 24 being lifted higher with respect to the chassis than at the opposite end region 24b.

In this way, therefore, it is possible for inclinations of the floor 16 to be compensated not only transversely to the direction of travel by two cooperating conveyor units 20 of a conveyor device 18, but also longitudinally to the direction of travel of the conveyor device 18 by one of the conveyor units 20 in each case.

Further options for designing the conveyor units are revealed in DE 20 2014 006 562 U1.

Control Process

Figure 5:
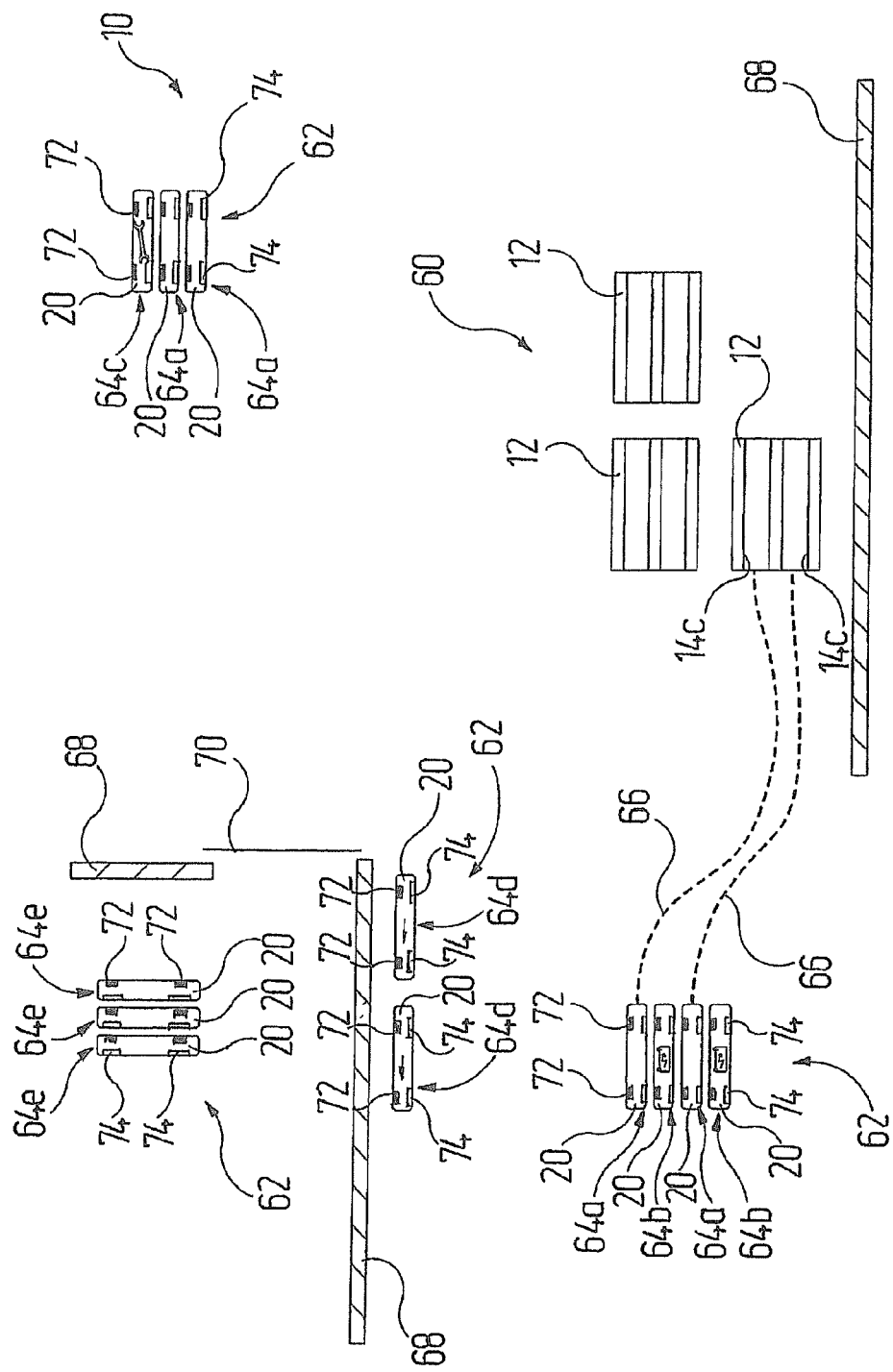
FIG. 5 a view from above of a loading area with the conveyor system, which comprises various spatially distributed stocks of conveyor units for an incoming transportation order.

FIG. 5 shows a loading area 60 with multiple conveyor-unit stocks 62 which contain conveyor units 20 in various states. In a free state 64a, a conveyor unit 20 is ready for use and can arrive at the load carrier 12. In a charging state 64b, storage components of the conveyor units 20 are electrically charged. In a maintenance state 64c, maintenance or repair work is carried out on the conveyor units 20. In a transportation state 64d, the conveyor units 20 fulfil a transportation order assigned by the central control. In a blocked state 64e, a conveyor unit 20 cannot be used in a transportation order owing to insurmountable obstacles, such as walls 68 and/or doors 70, which block the route.

FIG. 5 shows a loading area 60 with a conveyor system 10 in which a signal is transmitted to the central control to indicate that a particular load carrier 12 should be transported to another location. Upon this, the central control determines two conveyor units 20 which are in a free state 64a and which would reach the load carrier 12 within the shortest time. The corresponding conveyor units 20 receive a transportation order so that their status switches to transportation state 64d. Therefore, a logical pairing takes place before a conveyor device 18 is formed by the two conveyor units 20. The two conveyor units 20 can communicate with one another and exchange status reports, for example, although they move individually and independently from one another towards the load carrier 12 to be transported. In this case, they each start to move at the same time in the direction of the load carrier 12 to be transported, along the respectively shortest route 66 in terms of the overall travel time of the two conveyor units 20 which is specified by a central control. In the embodiment shown in FIG. 5, the two routes 66 of the two conveyor units 20 are substantially parallel to one another. In this case, the conveyor units 20 are guided on their respective route 66 by way of reference objects in the environment, for example using radio or optical means. It is also alternatively possible to specify a plurality of GPS coordinates which are to be approached along the route 66.

It is furthermore conceivable that a superordinate and a subordinate status can already be assigned at this point in time so that, even in an empty configuration of the conveyor units 20, the first conveyor unit 20 with the superordinate status follows a route 66 specified by the central control and the second conveyor unit 20 with the subordinate status adapts its driving parameters so that, where possible, it arrives at the load carrier 12 together with the first conveyor unit 20. The two conveyor units therefore approach the load carrier 12 together.

The route 66 of the second conveyor unit can be determined in such a way that the conveyor unit 20 with the superordinate status reports its position to the central control or a control device in the form of an on-board control 58 and this in turn communicates with the second conveyor unit to specify its route 66. The above-mentioned on-board control 58 can be either that of the first or the second conveyor unit and can carry out the calculation of the subordinate route 66.

Figure 6:
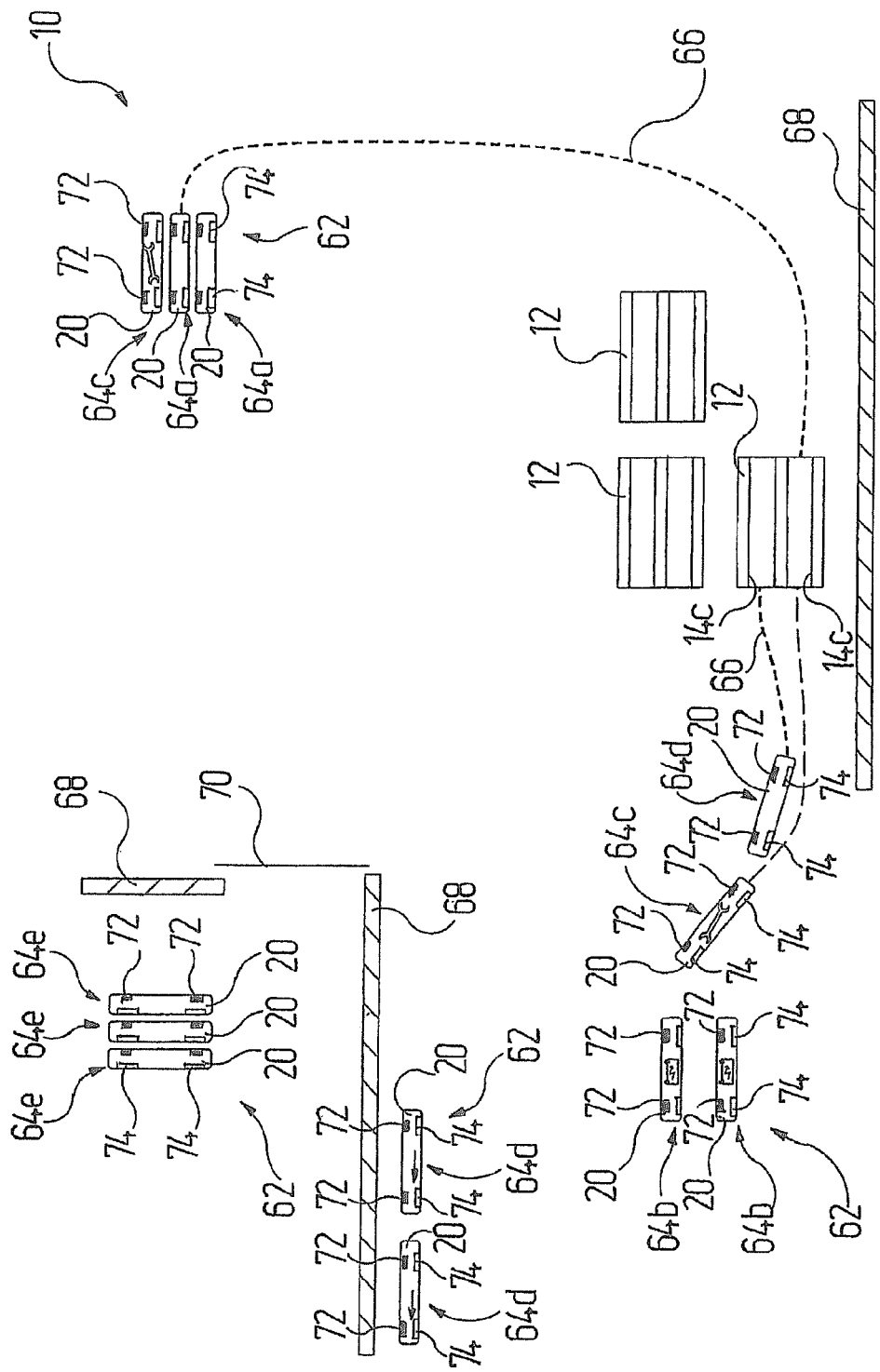
FIG. 6 a view from above, corresponding to FIG. 5, of the loading area, wherein a conveyor unit is in a maintenance state.

FIG. 6 shows the case in which, during the movement of the conveyor unit 20 which is driving on the right as seen in the direction of travel, a failure occurs so that its status has now switched to the maintenance state 64c. The central control now determines the next conveyor unit 20 which is in a free state 64a and sends a transportation order to it. At this point, a new pairing takes place, this time with the newly arriving conveyor unit 20 which has to approach the as yet unoccupied opening 14c in the load carrier 12. If the subordinate and the superordinate status have already been assigned, the newly arriving conveyor unit 20 assumes the status of the faulty conveyor unit 20.

Figure 7:
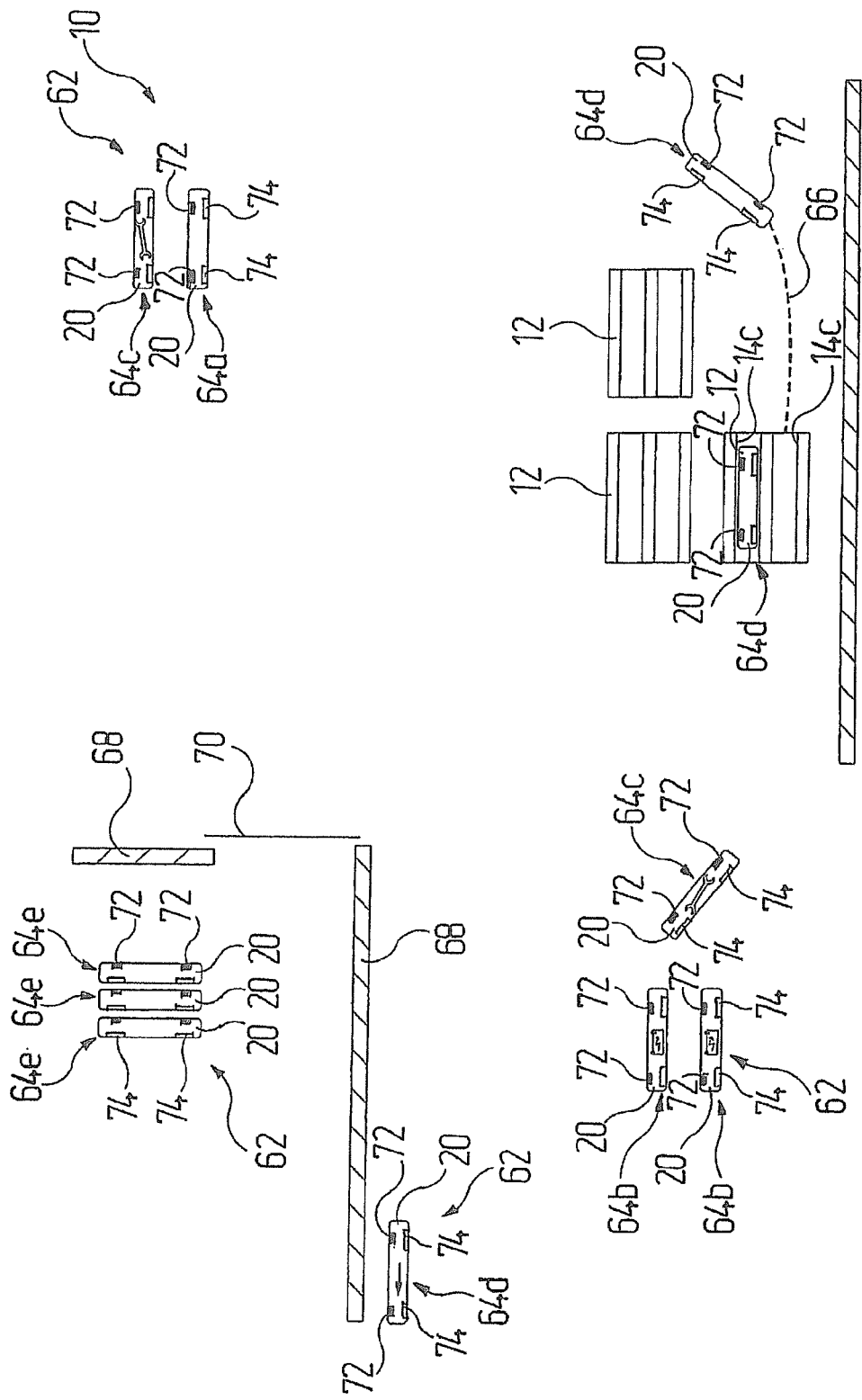
FIG. 7 a view from above, corresponding to FIG. 6, of the loading area, wherein a first conveyor unit has moved under the load carrier and a second conveyor unit is added.

In FIG. 7, the first conveyor unit 20 has already moved under the load carrier 12 and is positioned centrally in the corresponding opening 14c, upon which a ready message is sent to the central control. In the event of an off-centre alignment of the conveyor unit 20 along the opening 14c, a steering-angle offset is required to enable precise transportation of the load carrier 12. The alignment of each conveyor unit 20 against the load carrier 12 takes place with the aid of sensor units (not shown specifically), for example via camera systems or ultrasound, which are positioned in a front region of both end regions 24a, 24b. The conveyor units 20 are preferably aligned independently of one another along the respective opening 14c of the load carrier 12 to be transported and then form the conveyor device 18.

To prevent damage to objects and people, each conveyor unit 20 comprises safety devices (not shown specifically) which are arranged for example on the end faces of both end regions 24a, 24b. The safety devices can detect items or persons located on the route 66 and communicate this to the central control. In response to this, the central control implements an amendment to the driving parameters so that the conveyor unit 20 is stopped or a new route is designated.

So that the conveyor unit with the subordinate status can detect a shift in the mutual relative position of the two conveyor units 20 and adapt its driving parameters accordingly, two sensors 72 are provided along one longitudinal side of the conveyor unit 20, as shown in FIG. 6. This can increase the system availability. Each sensor 72 evaluates a light beam which is generated by a light source 74 arranged on the opposing conveyor unit 20. The sensors 72 here are constructed for example as cameras with a light-sensitive sensor surface which is illuminated by the light source 74. The sensors 72 determine an offset in the longitudinal direction from the absolute position of the illuminated regions. An angular offset and a spacing between the two conveyor units 20 is furthermore detected from the geometrical value of the individual illuminated regions and from the mutual difference between the values. It is possible to provide LEDs, for example, as light sources 74.

Each conveyor unit 20 is preferably equipped both with the sensors 72 and with the light sources 74 for position detection, so that all conveyor units 20 are structurally identical and each conveyor unit 20 can be operated both with the subordinate and with the superordinate status. In the embodiment shown, two sensors 72 and two light sources 74 are mounted in each case along only one longitudinal side of each conveyor unit 20. This arrangement has to be taken into account when a conveyor device 18 is formed.

So that the conveyor unit with the subordinate status can follow the conveyor unit with the superordinate status, the sensors 72 of the conveyor unit with the subordinate status have to face in the direction of the conveyor unit with the superordinate status. Ensuring this orientation for the newly added conveyor unit 20 sometimes requires a turning manoeuvre.

This can take place in that, as shown in FIG. 8, one of the roller pairs 34 remains stationary and the other roller pair 34 turns in a circular path around the first roller pair 34. Alternatively, the turning manoeuvre can be effected along a circular path, as already described above. If the diameter of the circular path is precisely equal to the spacing between the axes of rotation 36 of the conveyor unit, the conveyor unit 20 rotates on the spot. Since all four floor rollers 26 of the conveyor unit are coaxial to one another here, additional elements (not shown specifically) such as ball casters are provided for support in this case. To prevent the conveyor unit from tipping, these are arranged outside the plane which contains the two axes of rotation 36.

In the event that the assignment of the superordinate and subordinate status has not yet taken place, the central control decides on this. One criterion here can be the shortest time required to form the conveyor device. The time required to execute the turning manoeuvre can also be relevant here.

In order to achieve an orientation independency of the conveyor units, it is possible for two sensors 72 as well as two light sources 74 to be arranged along each of the longitudinal sides of the conveyor unit 20, with one sensor and one light source 74 always being opposite one another. This ensures that, irrespective of the orientation of the two conveyor units 20, one of the conveyor units can always follow the other.

In a further embodiment (not shown specifically), one sensor 72 can simultaneously evaluate two respective light signals from the two light sources 74, in which case the light sources 74 are arranged in correspondingly close proximity to one another. Therefore, for position detection, only one respective sensor 72 is necessary for each side, thereby enabling a reduction in manufacturing costs. Orientation independency is then ensured with such sensors 72 if one sensor 72 and two light sources 74 are arranged along each longitudinal side. In this case, one sensor 72 and two light sources 74 are always opposite one another in a formed conveyor device 18.

In a further embodiment (not shown specifically), a light source 74 and a sensor 72 are combined to form a module. In this case, light generated by the light source 74 is reflected on the opposing conveyor unit and detected by the sensor 74, whereby the position of the opposing conveyor unit can be determined by means of triangulation. To detect a mutual angular offset of the conveyor units, two such modules are used for each longitudinal side of a conveyor unit, which moreover increases the system availability in the event of a failure. If the modules are mounted on both sides of the conveyor units 20, they enable orientation independency of the conveyor units 20 to be realised during the formation of a conveyor device 18.

In the event that the central control, or alternatively the on-board control 58 of the conveyor unit 20 which has already arrived at the load carrier 12, does not transmit any information as to the precise position of the opening 14c to the second conveyor unit 20, it may be necessary for the conveyor unit 20 to firstly determine, by means of a clearance-detecting device, where an opening 14c is located and whether or not this is occupied. If this is occupied, the conveyor unit 20 accesses the adjacent opening 14c. After the second conveyor unit 20 has been aligned with the load carrier 12, as shown in FIG. 9, a ready message is sent to the central control. The supporting elements 28 of the two conveyor units 20 are then lifted in synchronised manner so that the load carrier 12 is lifted as a whole, and optionally with material to be conveyed placed on it. The load carrier 12 can then be conveyed to another location with the aid of the conveyor device 18. This enables the common movement of the conveyor units 20 in a conveyor device 18, as shown in FIG. 10.

If the conveyor device 18 is driving straight ahead, the floor rollers 26 in each chassis end region 24a, 24b of the first conveyor unit 20 of the conveyor device 18 are coaxial to the floor rollers 26 in the corresponding chassis end region 24a, 24b of the second conveyor unit 20 of the conveyor device 18. Alternatively, a slight offset of the axes of the roller pairs 34 can be tolerated if this is compensated mathematically when calculating the route by means of the above-mentioned steering-angel offset.

A type of parallel displacement of a load carrier 12 can take place if, after a straight-ahead movement, the roller pairs 34 of both conveyor units 20 of a conveyor device 18 are firstly rotated by the same angular amount about the axis of rotation 36 in the same direction of rotation, so that the axes of all floor rollers 26 are parallel to one another. If the floor rollers 26 are then all driven synchronously and identically, then the conveyor device assumes a linear-movement configuration for a diagonal movement.

When driving in a transverse direction with respect to the longitudinal axis of the conveyor device 18, the roller pairs 34 of both conveyor units 20 of the conveyor device 18 are each rotated through 90° about the axis of rotation 36 so that the floor rollers 26 are in each case coaxial to one another. All roller pairs 34 here are driven synchronously and identically.

If an empty conveyor unit 20 is now moved transversely, additional elements, such as ball casters, are provided for support, analogously to the rotation of the conveyor unit 20 on the spot as described above. These additional elements are arranged here outside the plane which contains the two axes of rotation 36.

It is particularly advantageous if it is possible to switch the subordinate and the superordinate status of the conveyor units 20 at any time. The conveyor units 20 are re-orientated here so that the sensors 72 of the conveyor unit 20 with the subordinate status are directed towards the conveyor unit 20 with the superordinate status. Alternatively, the conveyor units 20 described above can be used with a two-sided arrangement of sensors 72 and light sources 74 which do not have any orientation dependency in a conveyor unit 18. This results in a considerable increase in the flexibility of the conveyor system 10. It is moreover favourable if, in the event of a failure of a conveyor unit 20, the conveyor device 18 is dismantled and re-formed with a newly arrived conveyor unit 20.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A control process for controlling a conveyor system, comprising
the steps of:
a) providing laden and unladen load carriers,
b) providing a conveyor system which comprises a first free-moving conveyor unit and a second free-moving conveyor unit separated from each other, wherein each free-moving conveyor unit comprises
a chassis configured to move on floor rollers,
a supporting element which is carried along by the chassis and is configured to be lifted or lowered in relation to the chassis in such a way that, in an empty configuration, the conveyor unit can move under one of the load carriers and, in a conveying configuration, the conveyor unit can carry one of the load carriers by means of the supporting element;
a drive system which is configured to drive at least one of the floor rollers and the supporting element, and
a control device, to which a central control assigns a route, and which determines, on the basis of the route, driving parameters which are used to control the drive system,
wherein the first free-moving conveyor unit and the second free-moving conveyer unit together form, when they are in a conveying state and are arranged so that their longitudinal axes extend parallel to each other, a conveyor device that is configured to carry a load carrier; and
c) at least when the load carrier is unladen and the first and second free-moving conveyor units are in the conveying configuration:
assigning a superordinate status to the first free-moving conveyor unit,
assigning a subordinate status to the second free-moving conveyor unit in such a way that the second free-moving conveyor unit follows the first free-moving conveyor unit, and
detecting a shift in the mutual relative position of the first free-moving conveyor unit and the second free-moving conveyor unit with the aid of a sensor, and
modifying driving parameters, which are used to control the second free-moving conveyor unit, depending on the shift in the relative position which is detected by the sensor.

2. The control process of claim 1, wherein the first and second free-moving conveyor units approach a load carrier to be transported individually and independently of one another so long as they do not carry a load carrier together.

3. The control process of claim 1, wherein the sensor is arranged along a longitudinal side of the second free-moving conveyor unit, and wherein the second free-moving conveyor unit is aligned in such a way that the sensor faces the first free-moving conveyor unit.

4. The control process of claim 1, wherein, when driving in a diagonal direction with respect to a longitudinal axis of the conveyor device, axes of all floor rollers of the first free-moving conveyor unit and the second free-moving conveyor unit are parallel.

5. The control process of claim 1, wherein, when driving in a direction which is perpendicular to the longitudinal axis of the conveyor device, axes of all floor rollers of the first free-moving conveyor unit are coaxial, and axes of all floor rollers of the second free-moving conveyor unit are coaxial.

6. The control process of claim 1, wherein in the event of a failure of a conveyor unit the conveyor device is dismantled and is re-formed with a newly added conveyor unit.

7. A conveyor system for conveying objects comprising:
at least a first free-moving conveyor unit and a second free-moving conveyor unit which is separate from the first free-moving conveyor unit, wherein each free-moving conveyor unit comprises
a) a chassis configured to move on floor rollers,
b) a supporting element which is carried along by the chassis and is configured to be lifted or lowered in relation to the chassis in such a way that, in an empty configuration, the free-moving conveyor unit can move under a load carrier and, in a conveying configuration, the free-moving conveyor unit can carry a load carrier on the supporting element;
c) a drive system which is configured to drive at least one of the floor rollers and the supporting element, and
d) a control device which is configured determine, on the basis of a route assigned from a central control, driving parameters used to control the drive system,
wherein the second free-moving conveyor unit comprises a sensor configured to detect a shift in a mutual relative position of the first free-moving conveyor unit and the second free-moving conveyor unit, and
further wherein the second free-moving conveyor unit is configured to modify the driving parameters determined by its control device depending on the shift in the relative position detected by the sensor.

* * * * *